United States Patent [19]

Kenyon

[11] 4,378,594
[45] Mar. 29, 1983

[54] HIGH SPEED TO LOW SPEED DATA BUFFERING MEANS

[75] Inventor: Keith L. Kenyon, Ithaca, N.Y.

[73] Assignee: NCR Corporation, Dayton, Ohio

[21] Appl. No.: 200,168

[22] Filed: Oct. 24, 1980

[51] Int. Cl.$^3$ ............................................. G06F 11/00
[52] U.S. Cl. ................................................. 364/900
[58] Field of Search ... 364/200 MS File, 900 MS File; 178/30

[56] References Cited

U.S. PATENT DOCUMENTS

| | | | |
|---|---|---|---|
| 3,622,701 | 11/1971 | Gardner | 178/30 |
| 3,739,350 | 6/1973 | Moran | 364/900 |
| 3,869,571 | 3/1975 | Delavie | 178/30 |
| 4,009,332 | 2/1977 | Van Hook | 364/900 X |
| 4,071,910 | 1/1978 | Stockebrand et al. | 364/900 |
| 4,079,458 | 3/1978 | Rider et al. | 364/900 |
| 4,125,873 | 11/1978 | Chesarek | 364/900 |

*Primary Examiner*—Harvey E. Springborn
*Attorney, Agent, or Firm*—J. T. Cavender; Albert L. Sessler, Jr.

[57] ABSTRACT

A system is provided in which a memory is divided into two parts, so that a substantially continuous printing operation can be carried out by reading information to be printed from one part of the memory, with printing being interrupted for brief periods of time to permit writing of information in the other part of the memory. The writing into the memory is done on an alternate line basis, with the omitted lines being filled during a subsequent write operation so as to convert the interlace input to a standard format. At an appropriate time, the two parts of the memory are switched so that the read-out for the printing is carried out from the part into which information has just been written, and the writing takes place in the part of the memory which has been cleared during the preceding read operation.

14 Claims, 14 Drawing Figures

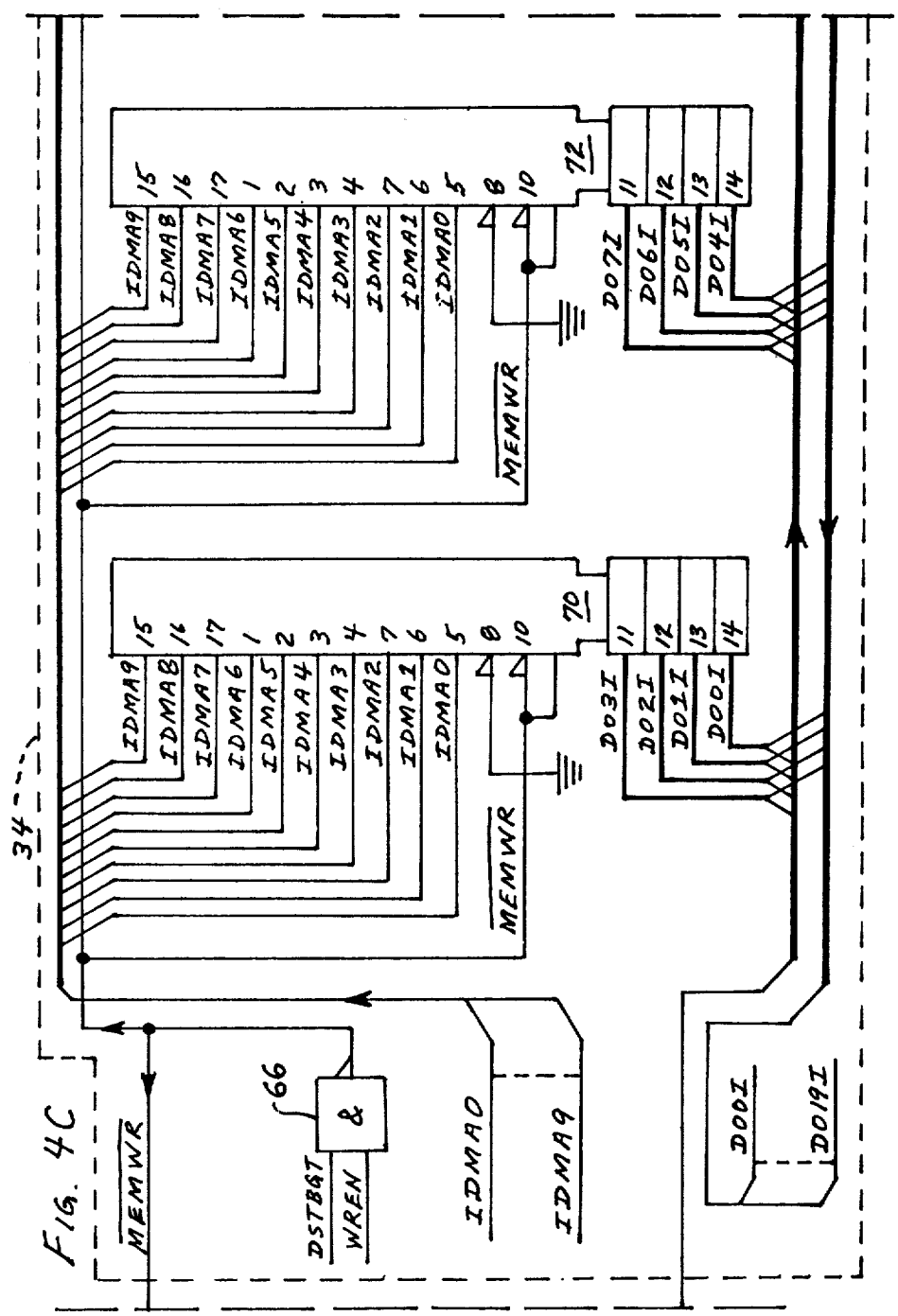

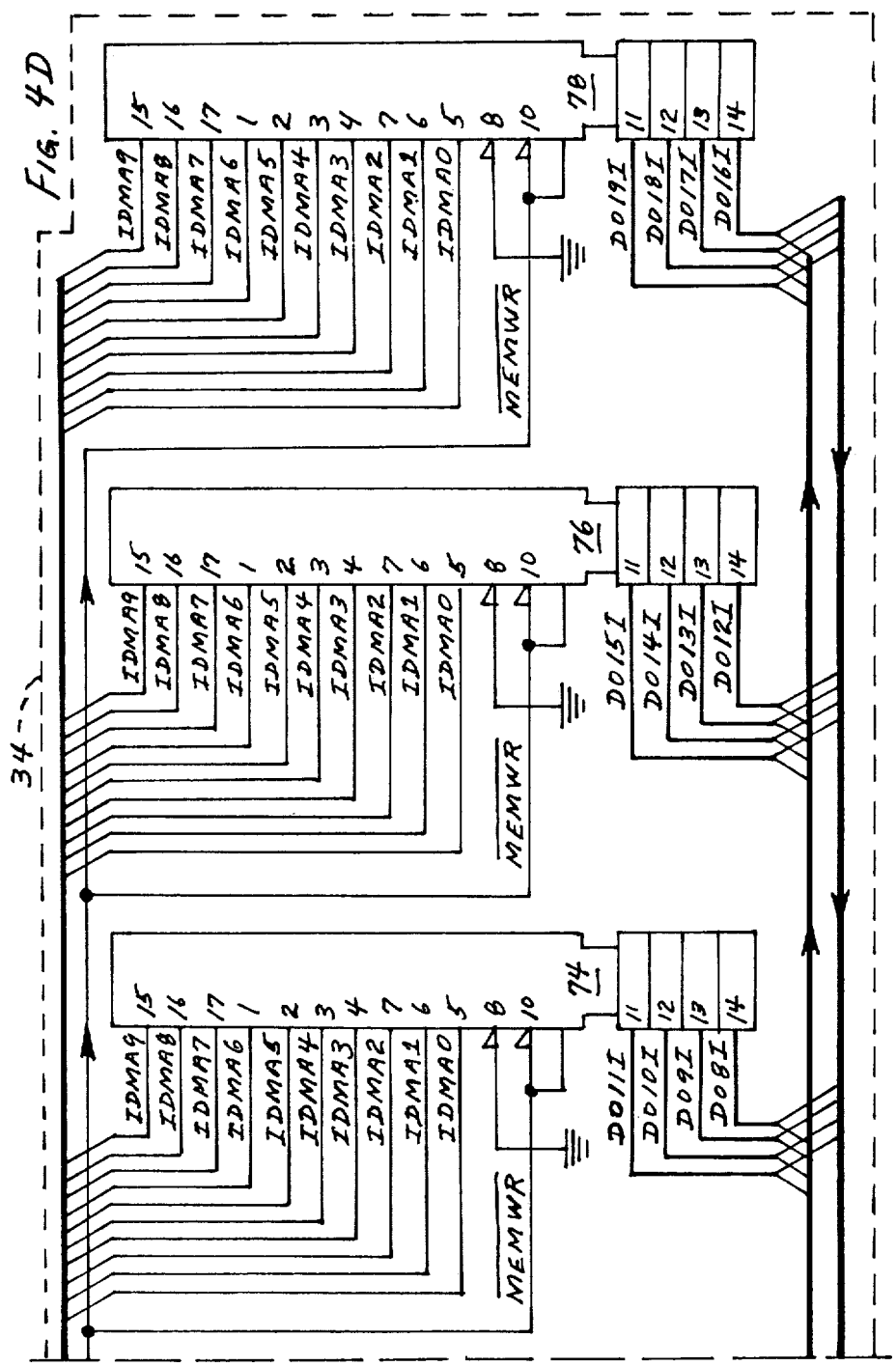

HIGH SPEED TO LOW SPEED DATA BUFFERING MEANS

BACKGROUND OF THE INVENTION

A need exists for high resolution printing apparatus capable of on-line for functioning to print data which is being simultaneously displayed on a cathode ray tube or similar device, without interfering with the flow of such data. For example, such printing apparatus may be needed in bank check processing systems in which checks are displayed on cathode ray tubes to enable operators to verify signatures and/or to manually encode on the check certain information, such as the amount, which they read from the check. In certain instances, a "hard" copy may be needed of the check being displayed, with such a copy being provided by a printer coupled to the CRT.

It will be recognized that certain problems must be solved in the provision of such printing apparatus. For one thing, the electronic scanning of the check for display purposes takes place at a very high speed, while a printer is inherently a substantially slower device. For another thing, electronic scanning and reproduction of images normally uses an interlace technique, in which adjacent image scan lines are generated and reproduced in alternate scans of the image by the scanning device. Printers do not normally operate in this fashion, and accordingly, some translation or conversion of the scanned information for printing purposes is desirable.

SUMMARY OF THE INVENTION

The present invention overcomes the above-stated problems by providing a two-part, or two-section, memory, either part of which may be written into or read from, with said writing being in an alternate line mode on successive operations to convert the interlace format to a standard format.

It is accordingly, an object of the present invention to provide a novel and efficient apparatus and method for substantially continuous storage and printing of information taken from a high-speed data transmission devices.

A further object is to provide a data storage system employing a plurality of separate memory units which are alternately employed for reading and writing of information to and from external devices.

A further object is to provide a buffer for enabling the printing of raster scan display data.

A further object is to provide buffering apparatus for transferring data from a relatively high speed source to a relatively low speed utilizing device.

With these and other objects, which will become apparent from the following description, in view, the invention includes certain novel method steps, features of construction and combinations or parts, one form or embodiment of which is hereinafter described with reference to the drawings which accompany and form a part of this specification.

BRIEF DESCRIPTION OF THE DRAWINGS

FIG. 3 is a group of diagrams showing the manner in which FIGS. 4, 5 and 6 are assembled to form schematic diagrams.

FIGS. 4A-4D inclusive, taken together, constitute a circuit diagram showing the latch and data storage means for the system of the present invention.

DETAILED DESCRIPTION

Figure 1:
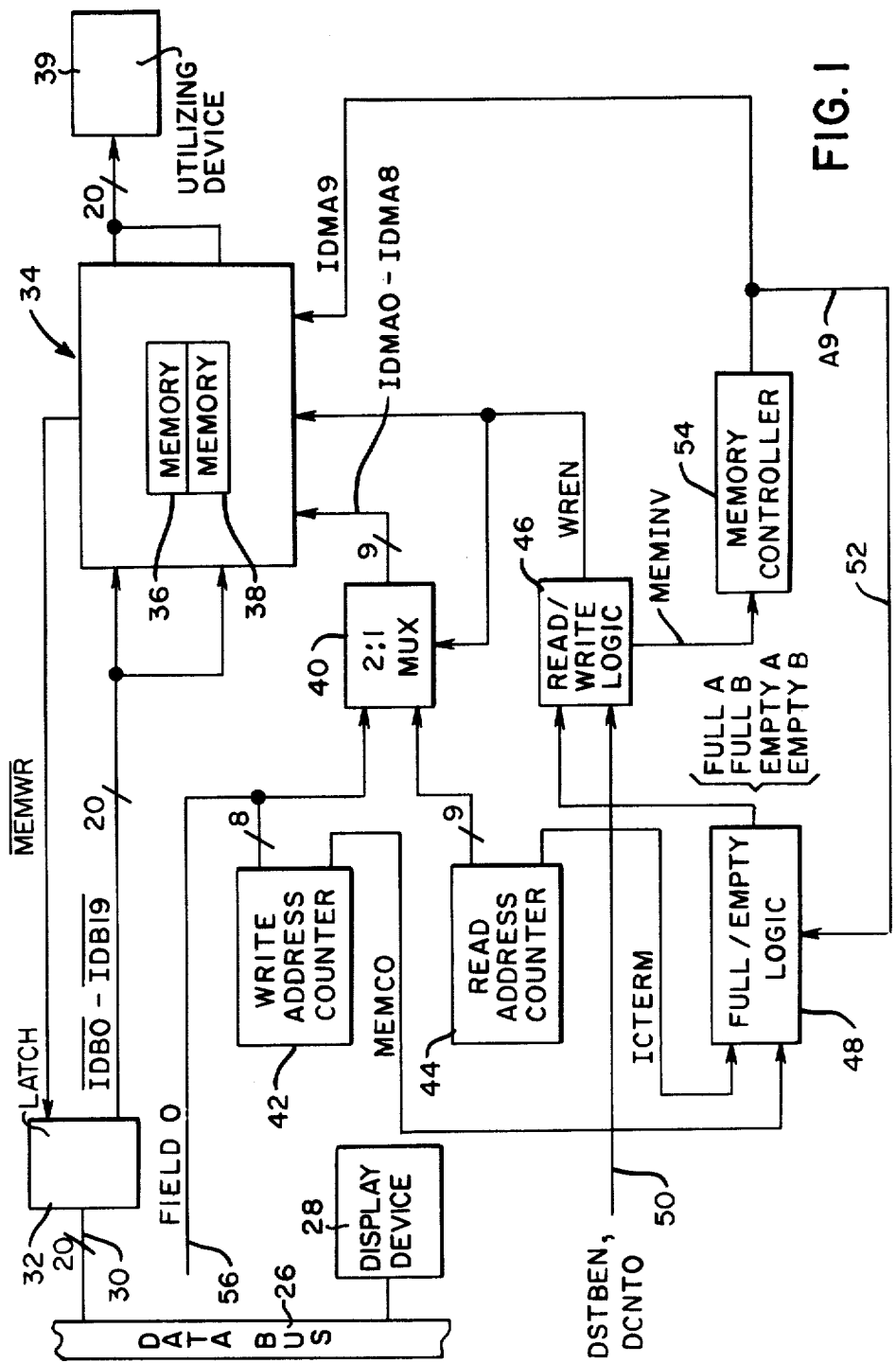
FIG. 1 constitutes a block diagram of the novel buffering system of the present invention.

Referring now to FIG. 1, the block diagram appearing therein shows an illustrative organization of various elements of the present invention.

Data to be printed or otherwise utilized is inputted to the system of FIG. 1 on a plurality of parallel data lines 30, which are applied to a latch 32. This data will normally be taken from a data bus 26 coupled to a CRT display device 28, and will normally be in interlaced form, as is customary for data which is to be displayed on a CRT or similar device. As is well-known, data supplied for application to a raster for display in a CRT or a similar device is in an "interlaced" form, in which two overlapping fields are employed, one including even-numbered data lines and the other including odd-numbered data lines. Interlaced scanning is defined in the "Radio Shack Dictionary of Electronics", Fourth Edition, Third Printing-1975, Page 294, as "A system of scanning whereby the odd-and even-numbered lines of a picture are transmitted consecutively as two separate fields. These are superimposed to create one frame, or complete picture, at the receiver. The effect is to double the apparent number of pictures and thus reduce flicker." Data taken from such a data bus is normally in the form of two fields, a first of which includes odd-numbered lines of data, followed by a second field which includes even-numbered lines of data. Therefore, if the data taken from such a bus were applied directly to a printer or other utilizing device, it would be reproduced in a garbled form.

In order to compensate for this, and also to provide storage for the data to accommodate the relatively slower speed of a printer or similar device compared to the speed of data transmission on the data bus, data buffering and conversion means are provided. Since the data being displayed on the CRT can be retained through a number of raster scans without alteration (as for example by retaining a document in the field of a scanner for a substantial period of time without movement of the document), the data desired to be printed can be written into the memory in incremental divisions, with printing being deferred until all necessary data has been received by the memory through multiple samplings of the data bus.

In the illustrated embodiment, it will be assumed that 20 data bits appear from the data bus on 20 parallel data lines 30, and are held temporarily in the latch 32. It will also be assumed that each line of the total data display which appears on the CRT, and which is to be printed by a printer coupled to the system of the present invention, is 1280 bits or dot positions wide and that 1024 lines are required for the complete display. Each display or "page" increment which can be stored in the system of the present invention is 8 lines. Each display line consisting of 1280 dots is stored as a plurality of 20-bit segments. Thus, a "group" of 64 segments is required to complete a horizontal line. In a display of 1024 horizontal lines, 128 display increments must be stored and retrieved to complete the entire extent of the display. Each 8-line increment includes 4 odd-numbered lines in a first field and 4 even-numbered lines in a second field.

Figure 2A:
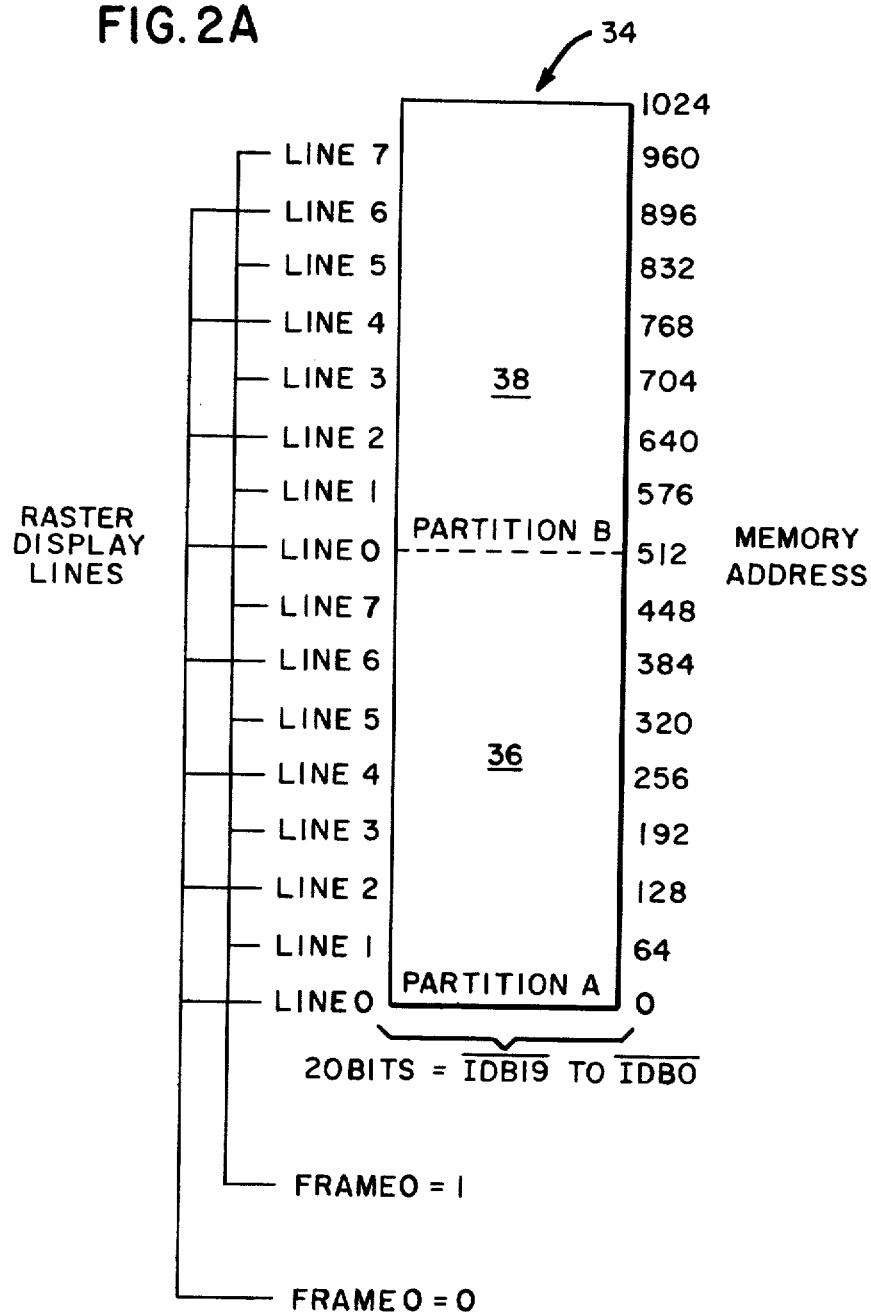
FIG. 2A is a memory map showing how the display data is organized.
Figure 2B:
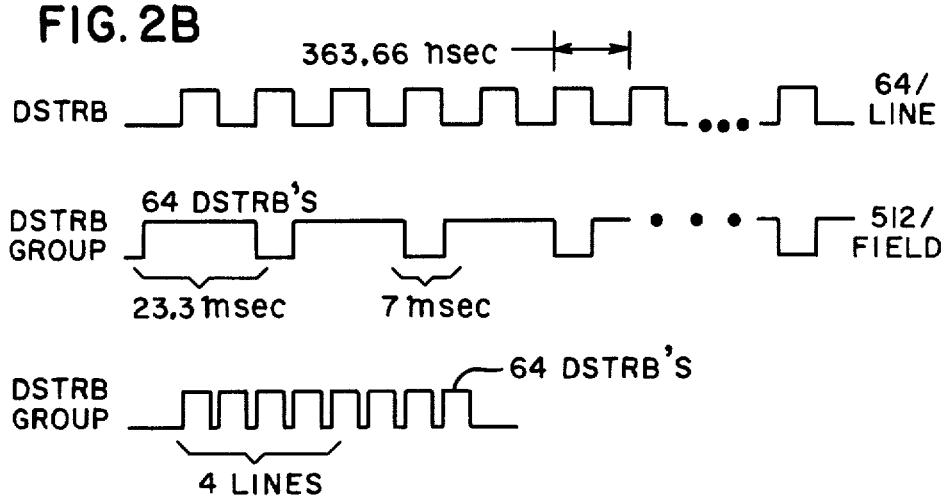
FIG. 2B contains a plurality of waveforms associated with the operation of the present invention.
Figure 3:
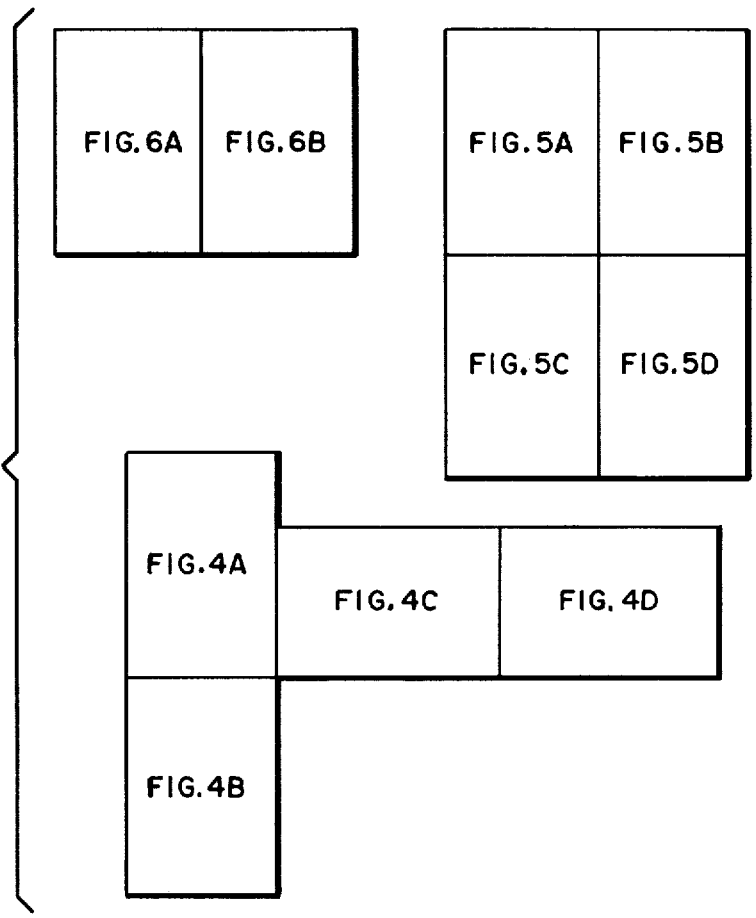

FIG. 2B shows a plurality of waveforms illustrating the timing of information received from the data bus with which the system is associated. The signal DSTRB (also see FIG. 4A) is a synchronizing signal which occurs once for each twenty-bit data input. As shown in the second waveform, there are 512 groups of 64 DSTRB signals per line required for each eight-line display field. As shown in the third waveform, also representing groups of DSTRB signals, the data is sampled in groups of four consecutive lines from the data bus. Typical time figures for the illustrated embodiment of the invention are shown on the waveforms. It will be noted that the total time for storing each scan line is approximately 30.3 microseconds, so that the total time for storing a field of four scan lines is approximately 120 microseconds.

As shown in FIG. 2A, a storage device 34 is functionally divided into two memories 36 and 38, each of which is adapted to store up to 8 lines of data of 1280-bit length, with each line being received in a series of sixty-four 20-bit "words" from the latch 32 during a write operation. Each memory is adapted to transmit said data to a utilizing device 39, such as a printer, during a read operation.

It will be seen that while a first one of the memories 36, 38, which contains data, is being read from and thus emptied, that reading operation may be interrupted to write data from the latch 32 into the second memory. When the second memory has been fully loaded with data, and reading of data from the first memory has been completed, the two memories switch modes, and reading of data from the second memory commences, while data can be written into the first memory, which is now empty.

The selected memory 36 or 38 may be addressed, through a multiplexer 40, either by a write address counter 42 during a write operation, or by a read address counter 44 during a read operation. A FIELD0 zero signal on an input 56 coacts with the write address counter 42 to provide the write address when the system is functioning in a write mode. The FIELD0 signal designates the beginning of a new scan, thus indicating by its low or high logic level which of the two fields are being scanned at the time.

Whether the selected memory 36 or 38 is in a read mode or a write mode is determined by the read/write logic 46, which also controls which of the address counters 42 or 44 is selected for addressing the selected memory. The read/write logic 46 is controlled by the full/empty logic 48 and by a write operation enable signal applied to an input 50. The full/empty logic 48 is controlled by the terminal count condition of the write address counter 42 and the read address counter 44, as well as by a signal A9 on a conductor 52 which is related to the selection of the memory 36 or 38.

Memory selection is determined by a memory controller 54, which responds to the condition of the read/write logic 46. The memory controller 54 provides the previously mentioned signal A9 to the full/empty logic 48.

Since the operation of reading from one of the memories 36, 38 of the storage device 34 is normally much slower than the operation of writing into one of said memories, because of the fact that the reading operation is tied to operation of a printer or similar device, the system will spend most of its operating time in the read mode. The system is therefore designed to permit interruption of a read operation from one of said memories for a write operation into the other of said memories, which takes relative little time, after which the system may return to a read mode for reading data from said one of said memories, if the read operation has not been completed.

The write address counter 42 and the read address counter 44 are each incremented by one count during each operating cycle of the system, up to a maximum count of 512, in the illustrated embodiment. Each count represents one 20-bit word address in one of the memories 36, 38. Terminal count signals generated at count 512 by each of the counters 42 and 44 are applied to the full/empty logic 48. The terminal count signal for the write address counter 42 is designated MEMCO, while the terminal count signal for the read address counter 44 is designated ICTERM.

Selection of the write address counter 42 or the read address counter 44 for a given operation is determined by the multiplexer 40 under control of signal WREN from the read/write logic 46. The multiplexer 40 will apply the address generated on nine lines by the counter 44 or by eight lines by the counter 42 plus the FIELD0 signal to the selected memory 36, 38 to enable either the writing of data into, or the reading of data from, the selected address of the selected memory. The same signal WREN which is applied to the multiplexer 40 from the read/write logic 46 is also applied to the storage device 34 to condition the selected memory 36 or 38 for a read or write operation, as the case may be.

The full/empty logic 48 is controlled by the aforementioned signals MEMCO and ICTERM from the counters 42, 44 and by the A9 signal from the memory controller 54. Four signals FULLA, FULLB, EMPTYA and EMPTYB are generated by the full/empty logic 48 and are applied to the read/write logic 46. These signals are used by the read/write logic 46 to derive the signal MEMINV which informs the memory controller 54 when and only when both a memory 36 or 38 undergoing a read operation is empty and a memory 36 or 38 undergoing a write operation is full. When both of these conditions are met, the memory controller 54 will invert the signals A9 and IDMA9. The signal IDMA9 controls the addressing of the storage device 34 so that selection of a memory 36 or 38 which was in a read mode will be switched to selection of the other memory 38 or 36 which will be in a write mode and vice versa.

The signals FULLA, FULLB, EMPTYA and EMPTYB, together with write operation enable signals DSTBEN and DCNT0, which are developed outside the system to indicate that the data sought to be written is available, are provided as inputs to the read/write logic 46. From the signals, the read/write logic 46 develops the write enable signal WREN, which shifts the selected memory 36 or 38 into the write mode, and which also switches the multiplexer 40 to cause the write address from the counter 42 to be input to the selected memory.

It will be seen from the above description, taken in conjunction with the block diagram of FIG. 1, that a system has been provided in which each of the two memories 36 and 38 may function in either a read mode or a write mode; that a read operation may be interrupted for a write operation involving the writing of either of two interlaced fields whenever data to be written is presented to the system, until the memory into which data is being written has been filled; and that when the memory being written into is filled, and the memory being read from is emptied, the operating modes of the two memories are automatically switched to enable continuation without delay of the desired reading and writing operations.

One illustrative circuit arrangement for implementing the system broadly disclosed in FIG. 1 will now be described in detail.

The storage unit 34 is shown in detail in FIGS. 4C and 4D, and comprises five 4K static RAMs 70, 72, 74, 76 and 78, which may be of type 2114-2, manufactured by Intel Corporation of Santa Clara, as well as a NAND gate 66, which may be of type 74LS00. The type 74LS00 component, like all components subsequently referred to in this specification having a "74" prefix, is manufactured by Texas Instruments, Inc., of Dallas, Tex.

The gate 66 has two inputs. A write enable signal WREN is applied to one of said inputs from the read/write circuit 46, and a signal DSTBGT, from outside the system, which synchronizes writing activity with data appearing on the exterior data bus, is applied to the other input. The output of said NAND gate 66 is a signal $\overline{MEMWR}$ which is applied to the latch 32, and to certain inputs of the RAMs 70, 72, 74, 76, 78, as will subsequently be described.

Each of these RAMs is four bits "wide" by 1024 addressable locations. Connection of the RAMs 70, 72, 74, 76, 78 effectively in parallel configuration thus provides a storage capacity of 1024 20-bit words. It will be seen that output signals from the latch 32 are applied in parallel to pins 11, 12, 13, 14 of the RAMs to effect writing therein, signals DO0I to DO3I being applied to RAM 70; DO4I to DO7I being applied to RAM 72; DO8I to DO11I being applied to RAM 74; DO12I to DO15I being applied to RAM 76; and DO16I to DO19I being applied to RAM 78. This provides storage of a 20-bit word in each instance. During a reading operation, the pins 11, 12, 13, 14 of the various RAMs serve as output pins to enable information in the form of 20-bit words to be read from the RAMs for employment by a utilizing device 39, such as a printer.

Addressing of the RAMs 70, 72, 74, 76, 78 in parallel is accomplished by application of the signals IDMA0 to IDMA8 from the multiplexer 40 to RAM pins 5, 6, 7, 4, 3, 2, 1, 17, 16, respectively, together with the signal IDMA9 from the memory controller 54 which is applied to pin 15. The read/write circuit signal $\overline{MEMWR}$ from the gate 66 is applied to pin 10 of each RAM, while pin 8 of each RAM is grounded.

It may be noted that the two memories 36 and 38 are functionally included within the storage unit 34, with memory 36 comprising the first 512 addresses of the combined RAMs 70, 72, 74, 76, 78 and the memory 38 comprising the second, or higher, value 512 addresses of said combined RAMs. The higher addresses are addressed whenever the signal IDMA9 is in high logic state. In effect, the signals IDMA0 to IDMA5 provide the 64 address components for each dot scan line or row; the signals IDMA6 to IDMA8 provide a row address component for a selected one of the eight rows; and signal IDMA9 provides a further address component for selection of either the memory 36 or the memory 38, depending upon whether it is in a low or high logic state, respectively.

Figure 4A:
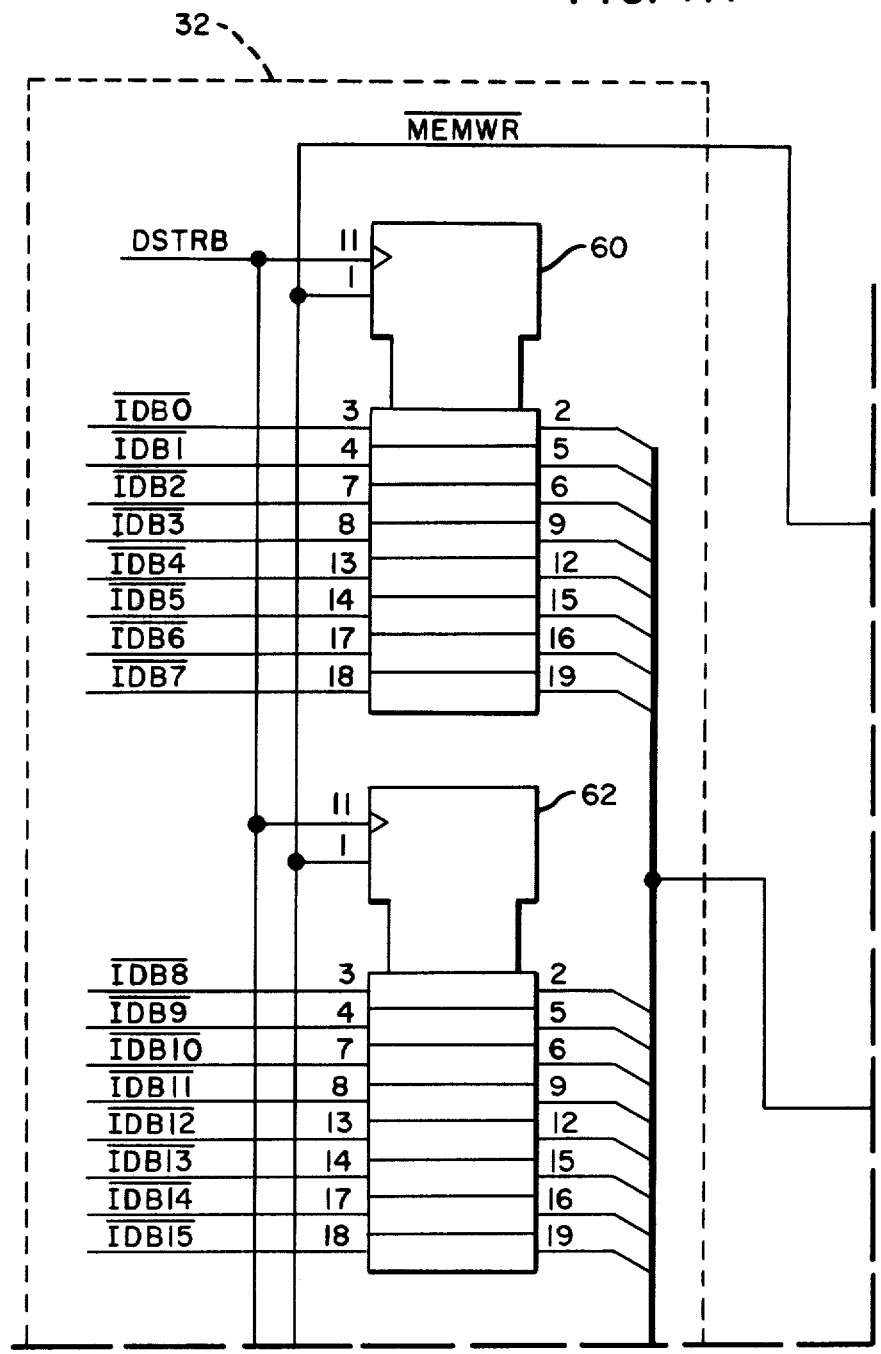
Figure 4B:
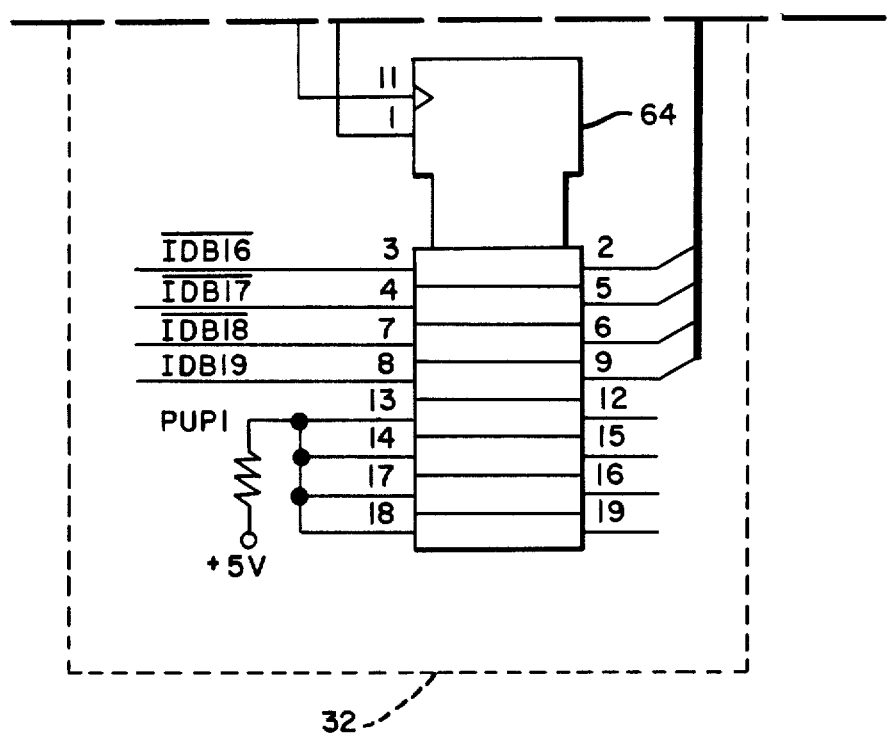

Latch 32 is shown in detail in FIGS. 4A and 4B, and comprises three octal D-type flip-flops 60, 62, 64, which may be of type 74LS374. Twenty bits of data from the previously referred-to data bus are applied as signals IDB0 to $\overline{IDB7}$ to pins 3, 4, 7, 8, 13, 14, 17 and 18, respectively, of flip-flop 60; as signals $\overline{IDB8}$ to $\overline{IDB15}$ to pins 3, 4, 7, 8, 13, 14, 17 and 18 of flip-flop 62; and as signals $\overline{IDB16}$ to IDB19 to pins 3, 4, 7 and 8 of flip-flop 64. A PUP1 line connects pins 13, 14, 17 and 18 of flip-flop 64 through a 1,000-ohm resister to a +5-volt source. Parallel output data signals DO0I to DO7I are taken from pins 2, 5, 6, 9, 12, 15, 16 and 19, respectively, of flip-flop 60; signals DO8I to DO15I are taken from pins 2, 5, 6, 9, 12, 15, 16 and 17, respectively, of flip-flop 62; and signals DO16I to DO19I are taken from pins 2, 5, 6 and 9, respectively, of flip-flop 64, and are applied to the previously-mentioned inputs of the storage unit 34.

The previously-described clock signal DSTRB, which originates outside the system for data strobe purposes, is applied to the clock input pins 11 of the flip-flops 60, 62 and 64. The output signal MEMWR from the gate 66 is applied to pin 1 of the flip-flops 60, 62, 64 to control the disabling and enabling of the output drivers of the latch 32.

A separate read counter 44 and a write counter 42 are employed in the present invention because the read and write cycles do not occur as sequential operations. The circuit must accommodate the interruptions of a reading operation by a writing operation, as previously described. Both of these counters provide inputs to the multiplexer 40.

Figure 5A:
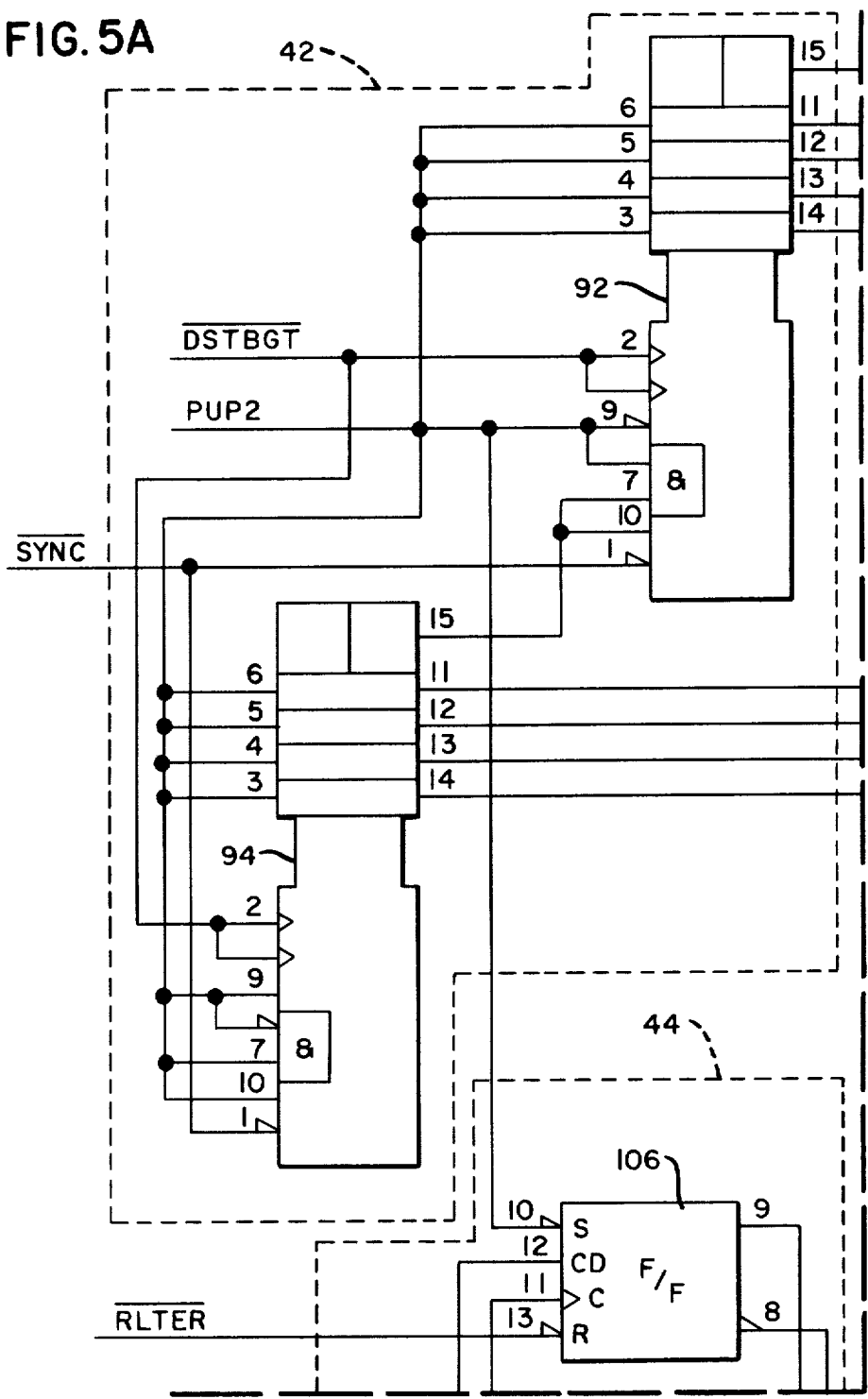
FIGS. 5A-5D inclusive, taken together, constitute a circuit diagram showing the write address counter, the read address counter and the multiplexer for the system of the present invention.
Figure 5B:
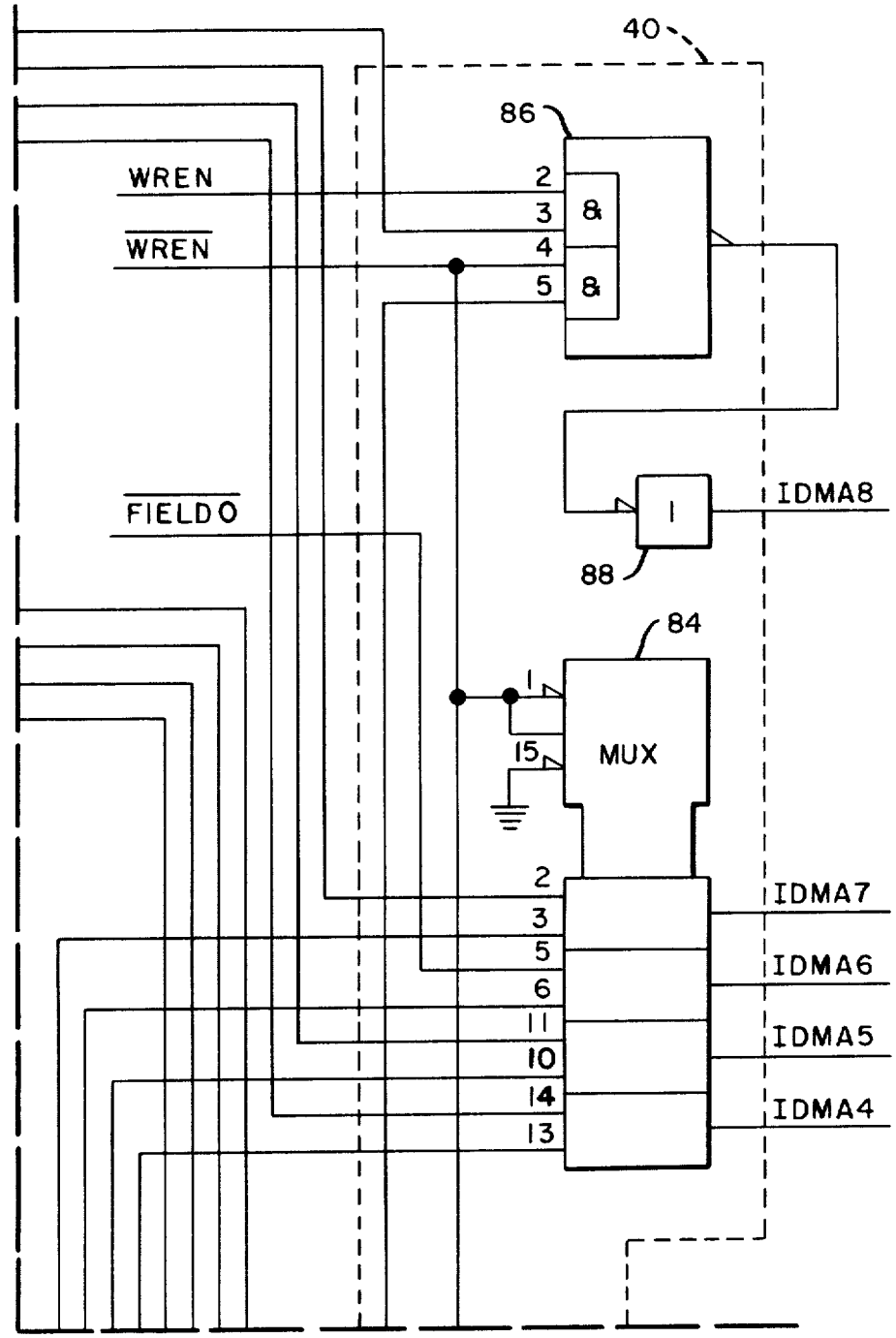
Figure 5C:
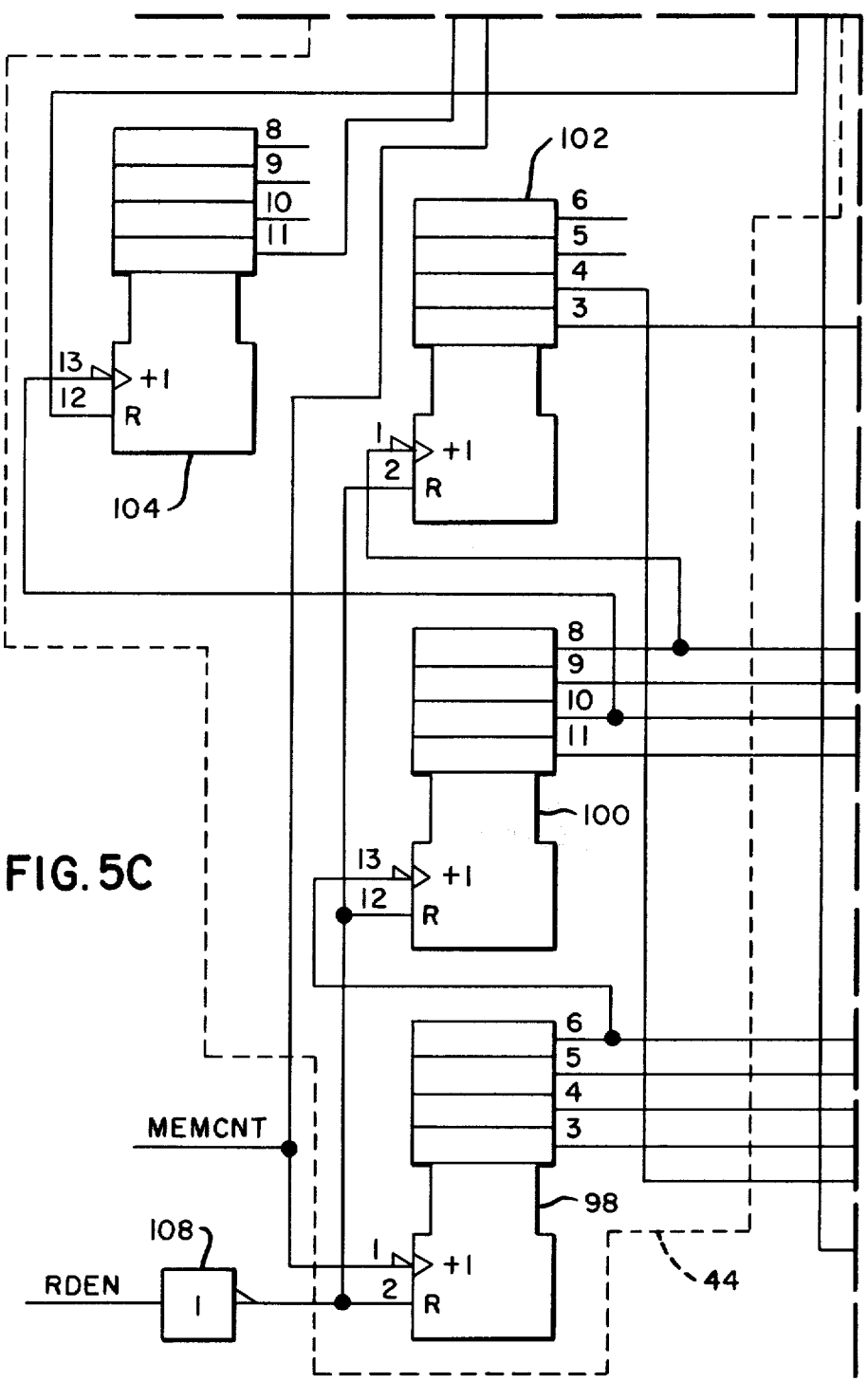
Figure 5D:
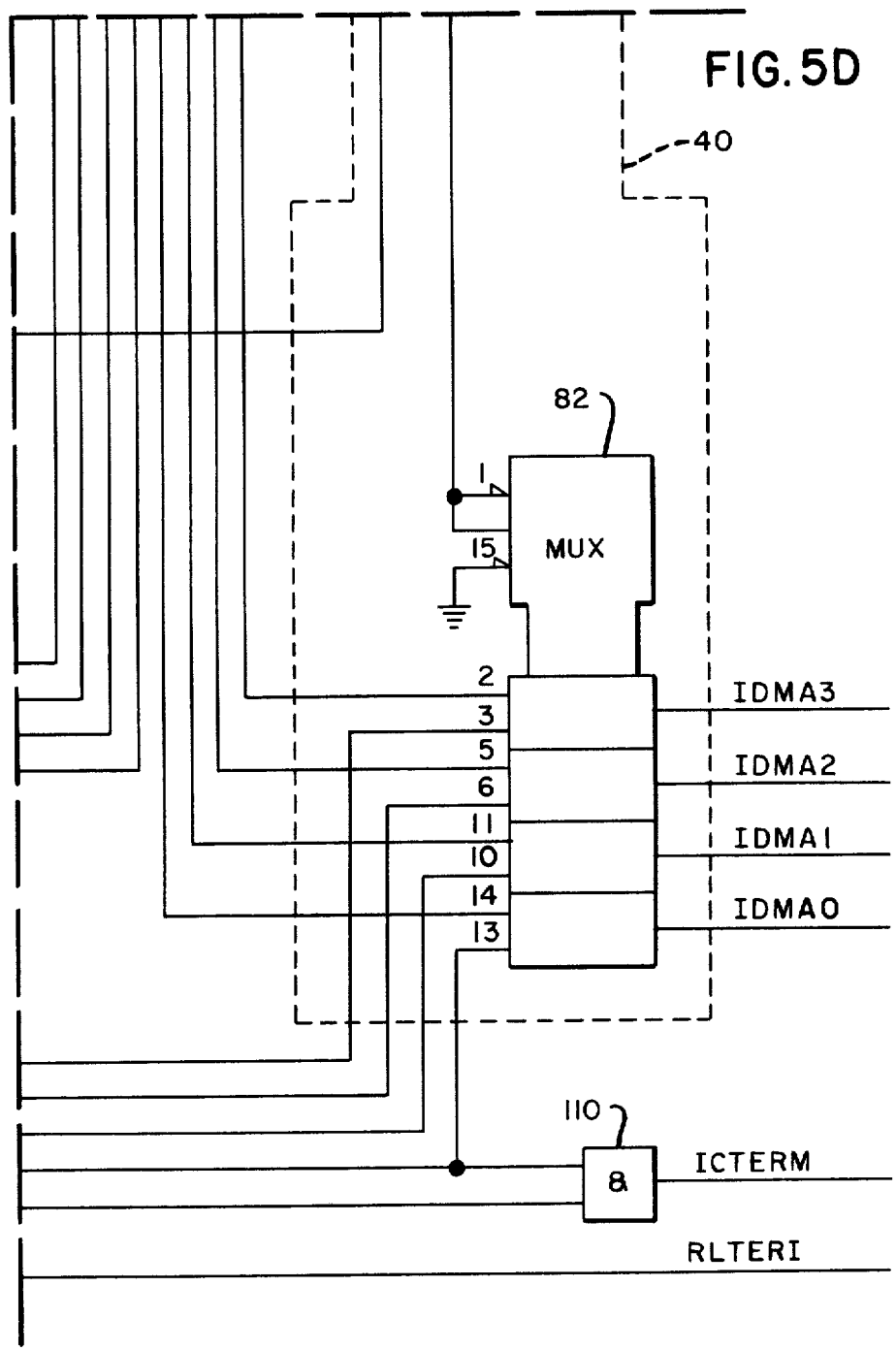

The multiplexer 40 is shown in detail in FIGS. 5B and 5D and comprises two demultiplexer units 82, 84, which may be of type 74LS157, plus an AND-OR-INVERT gate 86, which may be of type 74LS51 and an inverter 88, which may be of type 74LS04, connected to the output of the gate 86. Said multiplexer can address any one of 64 different locations in any one of eight dot row lines. Thus, a total of 512 20-bit word locations may be addressed in either of the two memories 36, 38. In order to provide 512 addresses, nine selection lines IDMA0 to IDMA8 from the multiplexer 40 are required, with a tenth line IDMA9 from the memory controller 54 being required for selection of one of the two memories 36, 38 included in the storage unit 34 depending upon whether the signal IDMA9 is in a low or high logic state, respectively.

Outputs IDMA0 to IDMA3 are taken from the unit 82; outputs IDMA4 to IDMA7 are taken from the unit 84; and output IDMA8 is taken from the inverter 88.

The operation of the multiplexer 40, namely in a read mode or in a write mode, is controlled by the write enable signals WREN and $\overline{WREN}$. The signal WREN is applied to pin 2 of the gate 86 while the signal $\overline{WREN}$ is applied to pin 4 of the gate 86 and to pin 1 of units 82, 84. These signals control whether the signals from the write counter 42 or the read counter 44 are provided on the outputs IDMA0 to IDMA8 of the multiplexer 40. Signals from the read counter 44 are applied to input pins 3, 6, 10 and 13 of the unit 82; to input pins 3, 6, 10 and 13 of the unit 84; and to input pin 5 of the gate 86. Signals from the write counter 42 are applied to input pins 2, 5, 11 and 14 of the unit 82; to input pins 2, 11 and 14 of the unit 84; and to input pin 3 of the gate 86. In addition, the $\overline{\text{FIELD0}}$ signal is applied to input pin 5 of the unit 84 to provide proper addressing of the interlaced dot row lines into the memory during a write operation. Pin 15 of the units 82 and 84 is grounded.

The write counter is shown in detail in FIG. 5A, and comprises two up-counters 92 and 94, which may be of type 74LS161. Input pins 3, 4, 5, 6 and 9 of counter 92 and input pins 3, 4, 5, 6, 7, 9 and 10 of counter 94 are connected by PUP2 through a 1,000-ohm resistor to a +5-volt source of potential. Counting of the counters 92 and 94 is effectuated by pulses of signal $\overline{\text{DSTBGT}}$ applied to pin 2 of said counters. This signal $\overline{\text{DSTBGT}}$ is derived outside the system from a data strobe signal. The counters 92 and 94 are reset by a $\overline{\text{SYNC}}$ signal applied to pin 1. Input pins 7 and 10 of counter 92 are connected to output pin 15 of counter 94.

Output pin 11 of counter 92 is connected to input pin 3 of gate 86 of the multiplexer 40. Output pins 12, 13 and 14 of the counter 92 are connected to input pins 2, 11 and 14 of the unit 84 of multiplexer 40. Output pin 15 of counter 92 provides a signal WRCNT. Output pins 11, 12, 13 and 14 of the counter 94 are connected to input pins 2, 5, 11 and 14 of the unit 82 of the multiplexer 40. It may be noted that the $\overline{\text{FIELD0}}$ line in effect makes the memory skip segments of 64 locations each. That is, so long as the $\overline{\text{FIELD0}}$ line is zero, or at a low logic level, it will write the first line taken from the data bus in the first 64 locations in memory, then it will cause the next 64 locations in memory to be skipped, before writing the second line taken from the data bus which is actually line three taken from the scan, due to the interlace feature of the data as it is applied to the cathode ray tube.

The read counter 44 is shown in FIGS. 5A and 5C, and comprises four counters 98, 100, 102 and 104, all of which may be of type 74LS393, together with a D-type flip-flop 106, which may be of type 74LS74. The counters 98, 100 and 102 are connected together to function as a ripple counter, with output pin 6 of counter 98 being connected to input pin 13 of counter 100, and output pin 8 of counter 100 being connected to input pin 1 of counter 102. Counting of the counters is effectuated by pulses of signal MEMCNT being applied to terminal 1 of counter 98, and the counters are reset by a read enable signal RDEN being applied through an inverter 108, which may be of type 74LS04, to input pin 2 of counter 98, input pin 12 of counter 100 and input pin 2 of counter 102.

Output pin 3 of counter 98 and output pin 4 of counter 102 are connected to inputs of an AND gate 110, which may be of type 74LS08. The output of said gate provides an ICTERM signal.

Output pins 3, 4, 5 and 6 of the counter 98 are connected to input pins 13, 10, 6 and 3, respectively, of the unit 82 of the multiplexer 40. Output pins 8, 9, 10 and 11 of the counter 100 are connected to input pins 3, 6, 10 and 13 of the unit 84 of the multiplexer 40. In addition, pin 8 of counter 100 is connected to pin 1 of counter 102, as previously described, and pin 10 of counter 100 is connected to input pin 13 of the counter 104, for a purpose which will subsequently be disclosed. Output pin 3 of counter 102 is connected to pin 5 of the gate 86 of the multiplexer 40.

It will be seen that the read address counter 44 addresses the sequential locations in memory, line by line. With the system operating in the read mode, the least significant address from the read counter appears as signal IDMA0 from the multiplexer 40, with the next most significant signal appearing as signal IDMA1, and so forth.

The counter 104, functioning as a flip-flop, and the flip-flop 106, acting together, provide a print command signal RLTER1 from output pin 8 of the flip-flop 106. The signal RLTER1 is generated at the end of each dot row line during a read operation to cause the printer to function. The previously-mentioned connection from output pin 10 of counter 100 to input pin 13 of the counter 104 provides an input signal for that counter.

Output pin 9 of flip-flop 106 is connected to input pin 12 of the counter 104 for reset purposes. Output pin 11 of the counter 104 is connected to input pin 12 of the flip-flop 106. A second input to the flip-flop 106 is provided by a MEMCNT signal applied to pin 11 thereof. Pin 10 of flip-flop 106 is connected by the PUP2 line through a 1000-ohm resistor to a +5-volt source of potential, and a signal RLTER generated by circuitry outside the system in response to printer operation is applied to input pin 13 to provide for resetting said flip-flop.

Figure 6A:
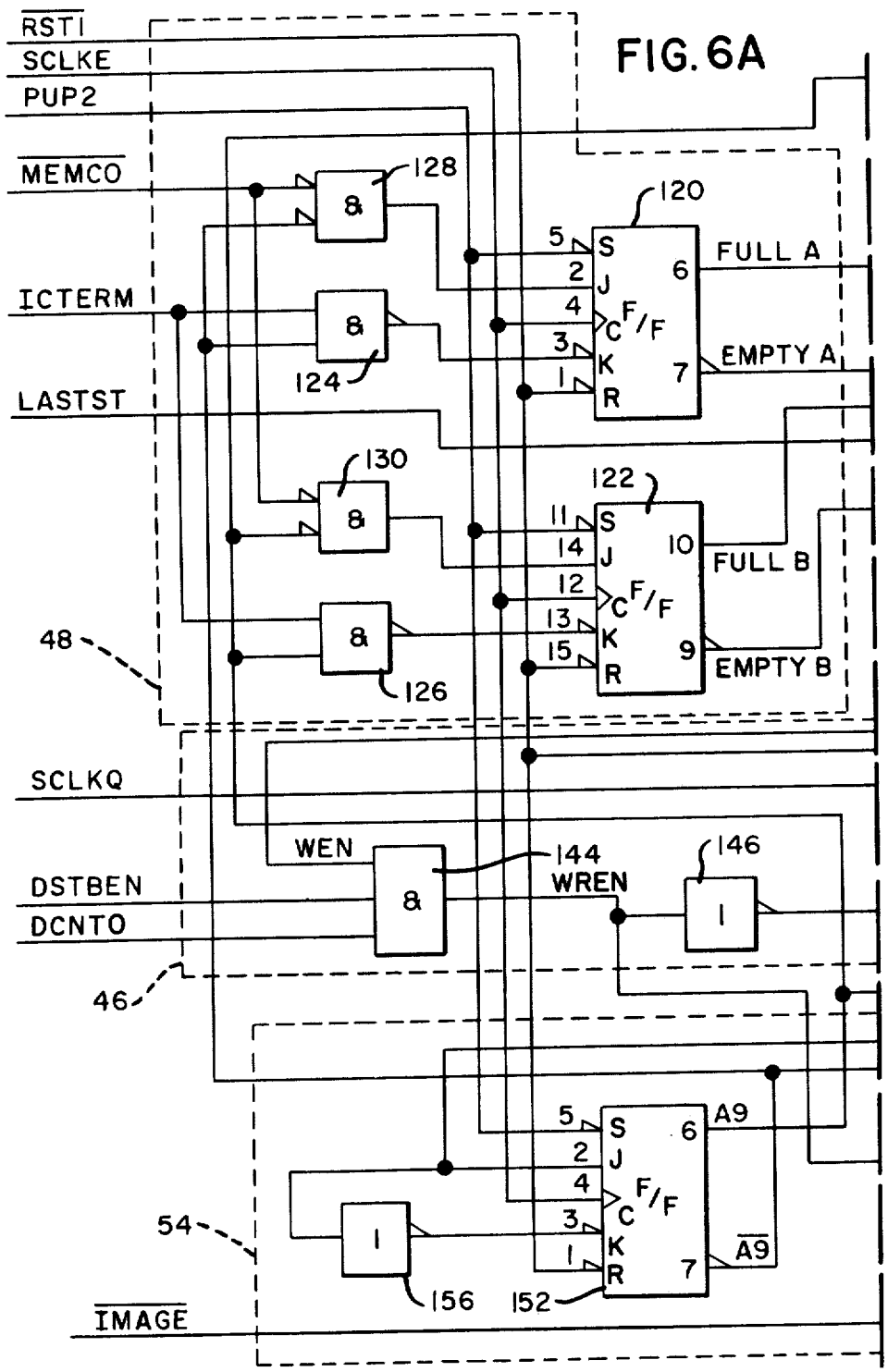
FIGS. 6A and 6B, taken together, constitute a circuit diagram showing the full/empty logic circuit, the read/write logic circuit, and the memory controller for the system of the present invention.

The full/empty logic circuit 48 is shown in detail in FIG. 6A, and comprises a pair of J-K flip-flops 120, 122, which may be of type 74LS109; a pair of NAND gates 124, 126, which may be of type 74LS00; and a pair of NOR gates 128, 130, which may be of type 74LS02. Each of the flip-flops 120 and 122 is dedicated to one of the memories 36, 38 respectively, so that the state of the flip-flop is dependent upon the full or empty condition of the corresponding memory. For convenience of notation, memory 36 is designated memory A and memory 38 is designated memory B.

The signal ICTERM from the read address counter 44 is connected to a first input of the gates 124 and 126. This signal indicates that the maximum count of 512 has been reached in the read counter. The signal $\overline{\text{MEMCO}}$ which is derived, by means of circuitry which does not form a part of the present invention, from the signal WRCNT from the write address counter 42, is connected to a first input of the gates 128 and 130. This signal indicates that the maximum count of 512 has been reached in the write counter. A signal A9 from the memory controller circuit 54 is applied to the other input of each of the gates 126 and 130; and a signal $\overline{\text{A9}}$ from the memory controller circuit 54 is applied to the other input of each of the gates 124 and 128. The signals A9 and $\overline{\text{A9}}$ provide an indication of whether the memory A is currently in a read mode or a write mode. Memory B will always be in the opposite mode.

The output of gate 124 is applied to the K input on pin 3 of the flip-flop 120; the output of gate 126 is applied to the K input on pin 13 of flip-flop 122; the output of gate 128 is applied to the J input on pin 2 of flip-flop 120; and the output of gate 130 is applied to the J input on pin 14 of flip-flop 122. In addition, the signal SCLKE originating outside the system is applied to the clock inputs on pins 4 and 12 of flip-flops 120 and 122; the signal RSTI originating outside the system is applied to the reset inputs on pins 1 and 15 of flip-flops 120 and 122; and the S inputs on pins 5 and 11 of flip-flops 120 and 122 are connected through line PUP2 through a 1000-ohm resistor to a +5-volt source of potential.

The outputs from pins 6 and 7 of the "memory A" flip-flop 120 provide signals FULLA and EMPTYA, respectively, to indicate the condition of that memory. Similarly, the outputs from pins 10 and 9 of the "memory B" flip-flop 122 provide signals FULLB and EMPTYB, respectively, to indicate the condition of that memory. These four signals are utilized in operation of the read/write logic circuit 46, as will subsequently be described.

Through the arrangement of gates and flip-flops comprising the full/empty logic circuit 48, an appropriate signal is provided to indicate by toggling of one of the flip-flops 120 or 122 when either of the memories A (memory 36) or B (memory 38) is full, or is empty. It will be noted that a flip-flop 120 or 122 will be switched to a "full" indication only during a write operation, and that a flip-flop 120 or 122 will be switched to an "empty" indication only during a read operation.

The read/write logic circuit is shown in detail in FIGS. 6A and 6B, and comprises a demultiplexer unit 132, which may be of type 74LS157; flip-flops 134 and 136, which may be of type 74LS273; and a plurality of gates which will be subsequently described. The function of this circuit is to develop a write enable signal WEN which is used at AND gate 144 to provide read/write control of the storage unit 34 and of the multiplexer 40, which signal will be changed in logic level when the memory into which writing is done has been filled. In addition, a write enable control signal WREN is developed which is applied to the memory controller circuit 54, and a read enable signal RDEN is developed whenever the memory doing the read operation is not empty. When the memory becomes empty, the signal RDEN changes logic level. An RDENB signal is generated which functions to inhibit a read operation when a write operation is being performed. A remote end of transmission signal $\overline{\text{REOTRI}}$ is developed, which provides a command signal to the printer or other utilizing device in response to reaching the end of a page.

The signals FULLA, EMPTYA, FULLB and EMPTYB from the full/empty logic circuit 48 are applied to input pins 2, 6, 3 and 5 respectively, of the demultiplexer unit 132. Input pin 1 of said unit is connected to the previously-mentioned A9 signal from the memory controller circuit 54, and pin 15 is grounded. The EMPTYA and EMPTYB signals are also connected to pins 9 and 10 respectively of an AND gate 138, which may be of type 74LS08.

Signals RDEN and WEN are provided at output pins 4 and 7, respectively, of the unit 132, and an EMPTY signal is provided at the output of the gate 138. This signal is combined with a last strobe signal LASTST from outside the system indicating the completion of the write operation, in a NAND gate 140, the output of which provides the signal $\overline{\text{REOTRI}}$, indicating that the end of a page has been reached.

The output signals RDEN and WEN from pins 4 and 7 of unit 132 are also applied to inputs 3 and 2 of a NOR gate 142, the output MEMINV of which is applied to the memory controller circuit 54. In addition, the signal WEN is applied to input pin 5 of a three input AND gate 144. Signals DSTBEN and DCNTO from outside the system are applied to the other two inputs of the gate 144. The output from this gate is the write enable signal WREN, which is also passed through an inverter 146, which may be of type 74LS04, to provide a signal $\overline{\text{WREN}}$.

The flip-flops 134 and 136 provide synchronizing timing and delay for generation of the signal RDENB. Input pins 3, 11 and 1 of the flip-flop 134 are connected respectively to signal $\overline{\text{WREN}}$, system clock signal SCLKQ, and reset signal $\overline{\text{RST1}}$. The output of the timing flip-flop 134 is connected to input pin 4 of the flip-flop 136, which provides a delay function. The other inputs 11 and 1 of the flip-flop 136 are connected to signals SCLKQ and $\overline{\text{RST1}}$. The output of flip-flop 136 is connected to input pin 3 of a three-input AND gate 148, input pins 4 and 5 of which are connected to signals WREN and RDEN, respectively. The output of the gate 148 is applied to one input of an OR gate 150, which may be of type 74LS32. The other input of the gate 150 is connected to the signal $\overline{\text{IMAGE}}$ from outside the system. The output of the gate 150 provides the signal RDENB. The signal RDENB is, in effect, an interrupt signal which prevents a read operation when a write operation has been commenced, or when the memory being read from is empty.

Figure 6B:
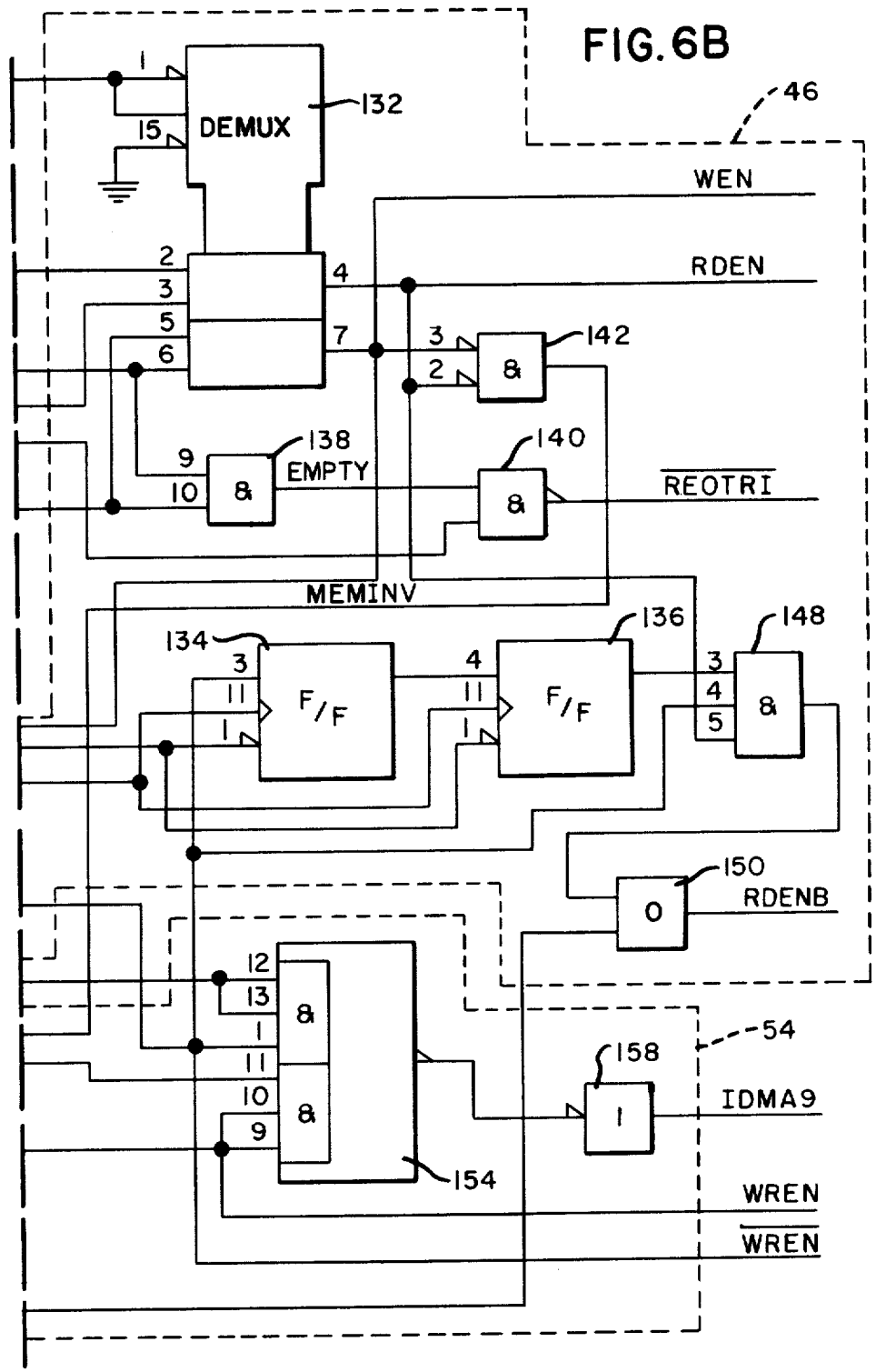

The memory controller 54 is shown in detail in FIGS. 6A and 6B, and comprises a J-K flip-flop 152, which may be of type 74LS109, an AND-OR-INVERT gate 154 which may be of type 74LS51, and two inverters 156 and 158, which may be of type 74LS04. The memory controller 54 provides a memory address selection signal IDMA9 which functions as an address line for the storage unit 34. A related address signal A9, $\overline{\text{A9}}$ is applied to the full/empty logic circuit 48, as has been previously described.

Input pin 5 of the flip-flop 152 is connected by the line PUP2 through a 1000-ohm resistor to a +5-volt source of potential. The output MEMINV of gate 142 of the read/write logic circuit 46 is connected to the J input at input pin 2 of the flip-flop 152, and is also connected through the inverter 156 to the K input at input pin 3 of said flip-flop. The clock input at input pin 4 of the flip-flop 152 is connected to the system clock signal SCLKE, and the reset input at pin 1 is connected to the reset signal $\overline{\text{RST1}}$.

The flip-flop 152 generates the previously-referred-to address signals A9 and $\overline{\text{A9}}$ from its outputs 6 and 7 respectively. The A9 signal is applied to input pins 12 and 13 of the gate 154 and the $\overline{\text{A9}}$ signal is applied to input pin 11 of said gate. The write enable signal $\overline{\text{WREN}}$ is applied to input pin 1 of said gate and the write enable signal WREN is applied to pins 9 and 10 thereof. The output of gate 154 is applied to the inverter 158 to provide the address signal IDMA9, which is the "most significant" address line for addressing the storage unit 34, and which determines which of the two memories 36 or 38 is selected.

It may be noted that the flip-flop 152 is caused to toggle or switch by a change of logic level on its J and K inputs (pins 2 and 3), which will always be at opposite signal levels. As previously mentioned, the signal applied to input J and, through the inverter 156, to signal K, is developed by the gate 142 in the read/write logic circuit 46. The output MEMINV of the gate 142 changes logic level when both read and write functions have been completed in a given instance; that is, when the memory 36 or 38 undergoing a write operation is now full and the memory being read from is now empty. This output level of the gate 142 is achieved when both signals WEN and RDEN, provided as inputs thereto, are low. The flip-flop 152 is caused by this to toggle at the next application of a clock signal to pin 4, changing the level of signals A9, $\overline{\text{A9}}$ and IDMA9. This effectively switches, or transfers, memories, so that the memory 36 or 38 which was involved in a read operation now becomes involved in a write operation and vice versa.

While the form of the invention illustrated and described herein is particularly adapted to fulfill the objects aforesaid, it is to be understood that other and further modifications within the scope of the following claims may be made without departing from the spirit of the invention.

I claim:

1. Data buffering apparatus comprising:
   first and second memory means, each capable of functioning in either a read mode or a write mode;
   means for writing data into either of said first or second memory means when said first or second memory means is functioning in a write mode;
   means for reading data from either of said first or second memory means when said first or second memory means is functioning in a read mode;
   means for interrupting a read operation of one of said memory means for a write operation into the other memory means; and
   means for switching the mode of at least one of said first or second memory means in response to the storage of data during a write operation to the limit of the capacity of said one of said first or second memory means.

2. Data buffering apparatus comprising:
   data storage means including a first portion and a second portion, each capable of functioning in either a read mode or a write mode;
   write means for writing data selectively into either of said portions which is in a write mode;
   read means for reading data selectively from either of said portions which is in a read mode;
   logic means for determining when one of said portions has no data stored therein or has data loaded therein to the limit of its capacity;
   selection means controlled by said logic means for selecting the portion of said data storage means having storage space available into which data may then be written, and the portion loaded to capacity from which data may then be read; and
   routing means controlled by said selection means for coupling either said write means or said read means to a first or second selected portion of said data storage means to enable a write operation to take place into a portion having storage space available or to enable a read operation to take place from a portion loaded to capacity.

3. Data buffering apparatus comprising:
   data storage means including a first portion and a second portion, each capable of functioning in either a read mode or a write mode;
   write means for writing data selectively into either of said portions which is in a write mode;
   read means for reading data selectively from either of said portions which is in a read mode;
   logic means for determining when one of said portions has no data stored therein;
   selection means for selecting the portion of said data storage means having no data stored therein into which data may then be written; and
   control means controlled by said logic means and said selection means for causing said write means to write data into said one of said portions of said data storage means having no data stored therein.

4. Data buffering apparatus comprising:
   data storage means including a first portion and a second portion;
   data input means capable of providing data to be written into either portion of said data storage means;
   write address means for providing addresses for the writing of data into said data storage means;
   read address means for providing addresses for the reading of data from said data storage means;
   multiplexer means for selectively coupling either said write address means or said read address means to said data storage means;
   logic means for determining when one of said portions has no data stored therein or is completely loaded with data;
   selection means for selecting the portion of said data storage means into which data may then be written; and
   control means controlled by said logic means and said selection means for controlling said data storage means and said multiplexer means to cause data to be written into said selected portion of said data storage means.

5. The data buffering apparatus of claim 4, said control means including field control apparatus for causing data received from said data input means to be written into said data storage means in odd storage locations in one writing operation and in even storage locations in another writing operation, whereby an interlaced format of input data is eliminated during storage.

6. The data buffering apparatus of claim 4, said control means including interrupt apparatus for causing a data reading operation on one portion to be interrupted for a writing operation on the other portion when said other portion is available for the writing of data.

7. The data buffering apparatus of claim 4 in which the write address means and the read address means both include counters.

8. The data buffering apparatus of claim 4 in which the logic means is controlled by terminal count signals from the read address means and the write address means to indicate the condition of the associated portion of said data storage means.

9. The data buffering apparatus of claim 4 in which the control means includes means for generating a supplemental address for selection of a desired one of said portions of said data storage means.

10. A method for the buffering of data comprising the following steps:
    (a) providing two storage means capable of functioning in either a read mode or a write mode for the storage of data;
    (b) providing means for enabling the writing of data into and reading of data from the two storage means;
    (c) writing predetermined data into a first of said storage means when enabled by said enabling means and when said storage means is functioning in a write mode;
    (d) reading the written data from said first storage means for transmission to a utilizing device when enabled by said enabling means and when said storage means is functioning in a read mode;
    (e) selectively interrupting the reading operation from said first storage means for performing a writing operation into the second storage means;
    (f) resuming said reading operation when said writing operation has concluded;
    (g) reversing the conditions of said storage means when said reading operation has concluded, so that the next writing operation will be performed using said first storage means; and (h) reading the written data from said second storage means when no writing operation is taking place, for transmission to a utilizing device.

11. The method of claim 10 in which steps (e) and (f) are repeated until all desired data has been read into said second storage means.

12. The method of claim 10 in which the data being written in step (e) is in interlaced form and is alternately written in successive writing operations in intercalated locations in the second storage means.

13. The method of claim 10 in which the reversing of conditions of the storage means as set forth in step (g) is continued so long as necessary for the buffering of additional data.

14. A method for the selective buffering of data from interlaced form to normal sequential form, comprising the following steps:

(a) providing first and second storage means for the storage of said data, with each of said first and said second storage means being capable of being written into and read from;

(b) writing a first set of lines of data in interlaced form into a first group of areas in said first storage means;

(c) writing a second set of lines of data in interlaced form into a second group of areas of said first storage means, which second group of areas are intercalated with respect to said first group of areas;

(d) reading the written intercalated data in normal sequential form from said first storage means for transmission to a utilizing device;

(e) selectively interrupting the reading from said first storage means for performing writing operations for sequentially writing first and second sets of data in interlaced form into intercalated groups of storage areas in the second storage means;

(f) resuming the reading from said first storage means in each instance when the writing operations into said second storage means having concluded;

(g) changing the status of said first storage means when said reading operation has concluded, so that the next writing operation is performed into said first storage means;

(h) reading the written data from said second storage means for transmission to a utilizing device; and (i) selectively interrupting the reading from said second storage means for performing writing operations for writing first and second sets of interlaced data into the second storage means.

* * * * *